United States Patent
Liu et al.

(10) Patent No.: US 7,915,947 B2
(45) Date of Patent: Mar. 29, 2011

(54) PTAT SENSOR AND TEMPERATURE SENSING METHOD THEREOF

(75) Inventors: Ming-Chung Liu, Hsinchu Hsien (TW); Shuo-Yuan Hsiao, Hsinchu Hsien (TW)

(73) Assignee: MStar Semiconductor, Inc., Hsinchu Hsien (TW)

( * ) Notice: Subject to any disclaimer, the term of this patent is extended or adjusted under 35 U.S.C. 154(b) by 0 days.

(21) Appl. No.: 12/631,138

(22) Filed: Dec. 4, 2009

(65) Prior Publication Data

US 2010/0219879 A1    Sep. 2, 2010

(30) Foreign Application Priority Data

Feb. 27, 2009    (TW) ................................ 98106349 A

(51) Int. Cl.
*H01L 37/00* (2006.01)
(52) U.S. Cl. ....................................................... 327/512
(58) Field of Classification Search .................. 327/512, 327/513, 539
See application file for complete search history.

(56) References Cited

U.S. PATENT DOCUMENTS

| | | | | |
|---|---|---|---|---|
| 4,267,468 A | * | 5/1981 | Hilliker | 327/512 |
| 5,614,816 A | * | 3/1997 | Nahas | 323/316 |
| 6,991,369 B1 | * | 1/2006 | Garavan | 374/178 |
| 6,997,606 B2 | * | 2/2006 | Marinet et al. | 374/178 |
| 7,281,846 B2 | * | 10/2007 | McLeod | 374/178 |
| 7,356,426 B2 | * | 4/2008 | Jain et al. | 702/99 |
| 7,880,459 | * | 2/2011 | Harvey | 323/313 |
| 2010/0013544 A1 | * | 1/2010 | Niederberger | 327/513 |

* cited by examiner

*Primary Examiner* — Lincoln Donovan
*Assistant Examiner* — William Hernandez
(74) *Attorney, Agent, or Firm* — WPAT, PC; Justin King

(57) ABSTRACT

A proportional to absolute temperature (PTAT) sensor is capable of reducing a sensing error resulted from a mismatch between circuit components. The PTAT sensor includes a control unit, a sensing unit and a calculation unit. The control unit generates a control signal. The sensing unit, comprising at least a pair of circuit components having a matching relationship, senses an absolute temperature under the first connection configuration and the second connection configuration respectively to generate a first voltage value and a second voltage value, wherein the first connection configuration and the second connection configuration are decided by interchanging the circuit connections of the pair of circuit components according to the control signal. And the calculation unit, coupled to the sensing unit, calculates a PTAT voltage value according to the first voltage value and the second voltage values.

15 Claims, 8 Drawing Sheets

PTAT SENSOR AND TEMPERATURE SENSING METHOD THEREOF

CROSS REFERENCE TO RELATED PATENT APPLICATION

This patent application is based on Taiwan, R.O.C. patent application No. 98106349 filed on Feb. 27, 2009.

FIELD OF THE INVENTION

The present invention relates to a temperature sensing circuit, and more particularly, to a proportional to absolute temperature (PTAT) sensor and a temperature sensing method thereof.

BACKGROUND OF THE INVENTION

A PTAT sensing circuit is a common temperature sensing circuit applied to a situation where accurate temperature detection is needed. For example, in a global position system (GPS) device, an oscillator frequency of a local oscillator needs to be extremely precise to maintain the accuracy of positioning. However, the oscillator frequency varies with the temperature. Therefore, the GPS device also needs to accurately sense the temperature to facilitate the local oscillator to generate a proper local frequency.

Referring to FIG. 1, a conventional PTAT sensing circuit applies a pair of bipolar junction transistors (BJTs) to sense the temperature. In a PTAT sensing circuit 10, when collector current densities of transistors Q4 and Q5 are different, a collector voltage difference ($\Delta V_{EB}$) between the transistors Q4 and Q5 satisfies Formula 1:

$$\Delta V_{EB} = V_T \ln[(I_{C4}/A_4)/(I_{C5}/A_5)]$$

where $V_T$ is equal to $kT/q$, $V_T$ is a thermal voltage, k is the Boltzmann's constant, T is an absolute temperature, q is an electric charge, $I_{C4}$ and $I_{C5}$ are respectively collector currents of the transistors Q4 and Q5, $A_4$ and $A_5$ are respectively emitter areas of the transistors Q4 and Q5, and $I_{C4}/A_4$ and $I_{C5}/A_5$ are respectively current densities of the transistors Q4 and Q5. Therefore, Formula 1 shows the relationship between the emitter-collector voltage difference $\Delta V_{EB}$ and the absolute temperature T. Furthermore, other components of the PTAT sensing circuit 10 amplify the emitter-collector voltage difference $\Delta V_{EB}$ to generate a PTAT voltage $V_{PTAT}$. $V_{PTAT}$ is obtained via a simple analysis:

$$V_{PTAT} = \Delta V_{EB} * 2 * (M4/M3) * (R_{11}/R_9),$$

The following Formula 2 is obtained by substituting $V_{PTAT}$ into Formula 1:

$$V_{PTA} = V_T \ln[(I_{C4}/A_4)/(I_{C5}/A_5)] * 2 * (M4/M3) * (R_{11}/R_9),$$

where M4/M3 is a current proportion of a current mirror formed by the transistors M3 and M4. The relationship between the PTAT voltage and the absolute temperature is thus established via Formula 2. Therefore, when the PTAT sensing circuit 10 operates, the absolute temperature being sensed is acquired according to the generated PTAT voltage.

However, a sensing error in the PTAT sensing circuit 10 may be resulted from a mismatch between its circuit components. More particularly, when the PTAT sensing circuit 10 is implemented via an integrated circuit (IC), factors during the production process of the IC inevitably cause the mismatch between the circuit components such that it is even more difficult to avoid the error. Take FIG. 1 for example. The mismatch circuit components may be the transistors Q4 and Q5, two input ends (regarded as circuit components) of an amplifier 11, the transistors M3 and M4, the resistors $R_8$ and $R_{10}$, and the resistors $R_9$ and $R_{11}$. For example, suppose that the relationships of the foregoing 5 pairs of circuit components are: an emitter area ratio of transistors Q4 and Q5 $A_5/A_4$ is 8, the amplifier 11 has no voltage offset between its two input ends, the current ratio of the current mirror formed by the transistors M3 and M4 M4/M3 is 1.5, $R_{10}/R_8$ is 1.5, and $R_{11}/R_9$ is 1.

Due to the IC manufacturing process or other factors, the foregoing relationships may become invalid, and the following circumstances are generated instead. For example, $A_5/A_4 = 8*(1+\Delta A_4)$, the amplifier 11 has a voltage offset $V_{offset}(T)$ between its two input ends, where the $V_{offset}(T)$ changes according to the absolute temperature T, $M4/M3 = 1.5*(1+\Delta M_4)$, $R_{10}/R_8 = 1+\Delta R_8$, and $R_{11}/R_9 = 1+\Delta R_9$. $\Delta A_4$, $V_{offset}(T)$, $\Delta M_4$, $\Delta R_8$ and $\Delta R_9$ respectively represent a mismatching extent of each pair of circuit components.

Under the foregoing mismatching circumstances, a sensing error in the $V_{PTAT}$ obtained from Formula 2 is caused to undesirably influence the accuracy of the PTAT sensing circuit 10. Via a further experiment, it is found that the mismatch between the transistors Q4 and Q5 and between two input ends of the amplifier is a main source of the sensing error.

SUMMARY OF THE INVENTION

In view of the foregoing issues, one object of the present invention is to provide a PTAT sensor capable of reducing a sensing error resulted from a mismatch of circuit components and a temperature sensing method thereof.

A PTAT sensor is provided according to the present invention. The PTAT sensor comprises a control unit, a sensing unit, and a calculation unit. The control unit generates a control signal. The sensing unit coupled to the control unit comprises an amplifier, a first transistor and a second transistor, a switch unit, and a current module. The amplifier has a first input end, a second input end, and an output end. The first transistor has a collector, a emitter and a base, and a second transistor has a collector, a emitter and a base, wherein the collector of the first transistor and the collector of the second transistor are coupled, and the emitter of the first transistor and the emitter of the second transistor are respectively coupled to the first input end and the second input end of the amplifier. The switch unit, coupled to the output end of the amplifier and one of the first transistor and the second transistor, switches between a first connection configuration and a second connection configuration according to the control signal, wherein under the first connection configuration, the base of the first transistor is coupled to a bias voltage and the base of the second transistor is coupled to the output end of the amplifier, and under the second connection configuration, the base of the first transistor is coupled to the output end, and the base of the second transistor is coupled to the bias voltage. The current module, coupled to the first transistor and the second transistor, provides a first current and a second current to the emitter of the first transistor and the emitter of the second transistor respectively under the first connection configuration, and providing the second current and the first current to the emitter of the first transistor and the emitter of the second transistor respectively under the second connection configuration. The sensing unit senses an absolute temperature under the first and second connection configurations to generate corresponding first and second voltage values. The calculation unit coupled to the sensing unit generates a PTAT voltage value according to the first and second voltage values.

A PTAT sensor is further provided according to the present invention. The PTAT sensor comprises a control unit, an sensing unit and a calculation unit. The control unit generates a control signal. The sensing unit, coupled to the control unit, comprises an amplifier, having a first input end, a second input end, and an output end; a first transistor having a collector, a emitter, and a base, and a second transistor having a collector, a emitter and a base, wherein the collector of the first transistor is coupled to the collector of the second transistor, the base of the first transistor is coupled to a bias voltage, and the base of the second transistor is coupled to the output end; a switch unit, coupled to the first input end and the second input end of the amplifier and one of the first transistor and the second transistor, for switching between a first connection configuration and a second connection configuration according to the control signal, wherein under the first connection configuration, the emitters of the first and second transistors are respectively coupled to the first and second input ends of the amplifier, and under the second connection configuration, the emitters of the first and second transistors are respectively coupled to the second and first input ends of the amplifier; and a current module, coupled to the first transistor and the second transistor, for respectively providing a first current and a second current to the emitters of the first transistor and the second transistor; wherein the sensing unit senses an absolute temperature under the first connection configuration and the second connection configuration to generate a first voltage value and a second voltage value. The calculation unit, coupled to the sensing unit, calculates a PTAT voltage value according to the first voltage value and the second voltage value.

A PTAT sensor is yet provided according to the present invention. The PTAT sensor comprises a control unit for generating a control signal; a sensing unit, comprising at least a pair of circuit components having a matching relationship, for sensing an absolute temperature under the first connection configuration and the second connection configuration respectively to generate a first voltage value and a second voltage value, wherein the first connection configuration and the second connection configuration are decided by interchanging the circuit connections of the pair of circuit components according to the control signal; and a calculation unit, coupled to the sensing unit, for calculating a PTAT voltage value according to the first voltage value and the second voltage values.

A method for generating a PTAT voltage is provided according to the present invention. The method comprises switching a PTAT circuit to a plurality of connection configurations respectively to generate a plurality of voltage values corresponding to the plurality of connection configurations, wherein the plurality of connection configurations are formed by interchanging circuit connections of at least one pair of circuit components having a matching relationship; and calculating a PTAT voltage value according to the plurality of voltage values.

DETAILED DESCRIPTION OF THE PREFERRED EMBODIMENT

As mentioned above, when an absolute temperature is sensed, a sensing error occurs for the reason of a mismatch between circuit components. Therefore, in a PTAT sensor according to the present invention, with respect to a pair or a plurality pairs of circuit components having matching relationships, switchable connection configurations are implemented to provide the pair or the plurality pairs of circuit components with interchangeable connection relationships. In this invention, a pair of circuit components A and B has interchangeable connection relationships. More specifically, the circuit components can replace each other, i.e, A can replace B, and B can replace A. The PTAT sensor respectively senses a temperature under various connection configurations to obtain corresponding voltage values and generates a final PTAT voltage value according to the voltage values obtained. For example, an average value calculated by the voltage values serves as a PTAT voltage value. Therefore, when the circuit components having matching relationships become mismatched due to the manufacturing process and other factors, the sensing error created by the mismatch is significantly reduced via a design according to the present invention.

Figure 1:
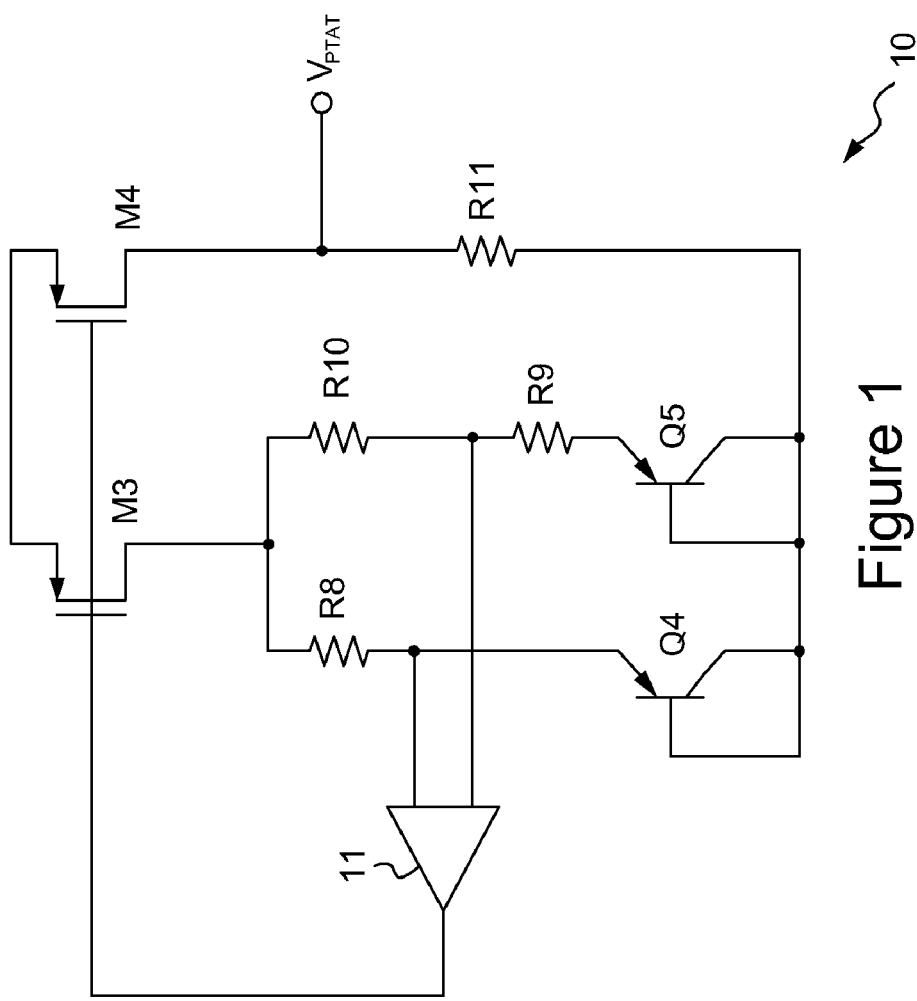
FIG. 1 is a circuit diagram of a conventional PTAT sensing circuit.
Figure 2:
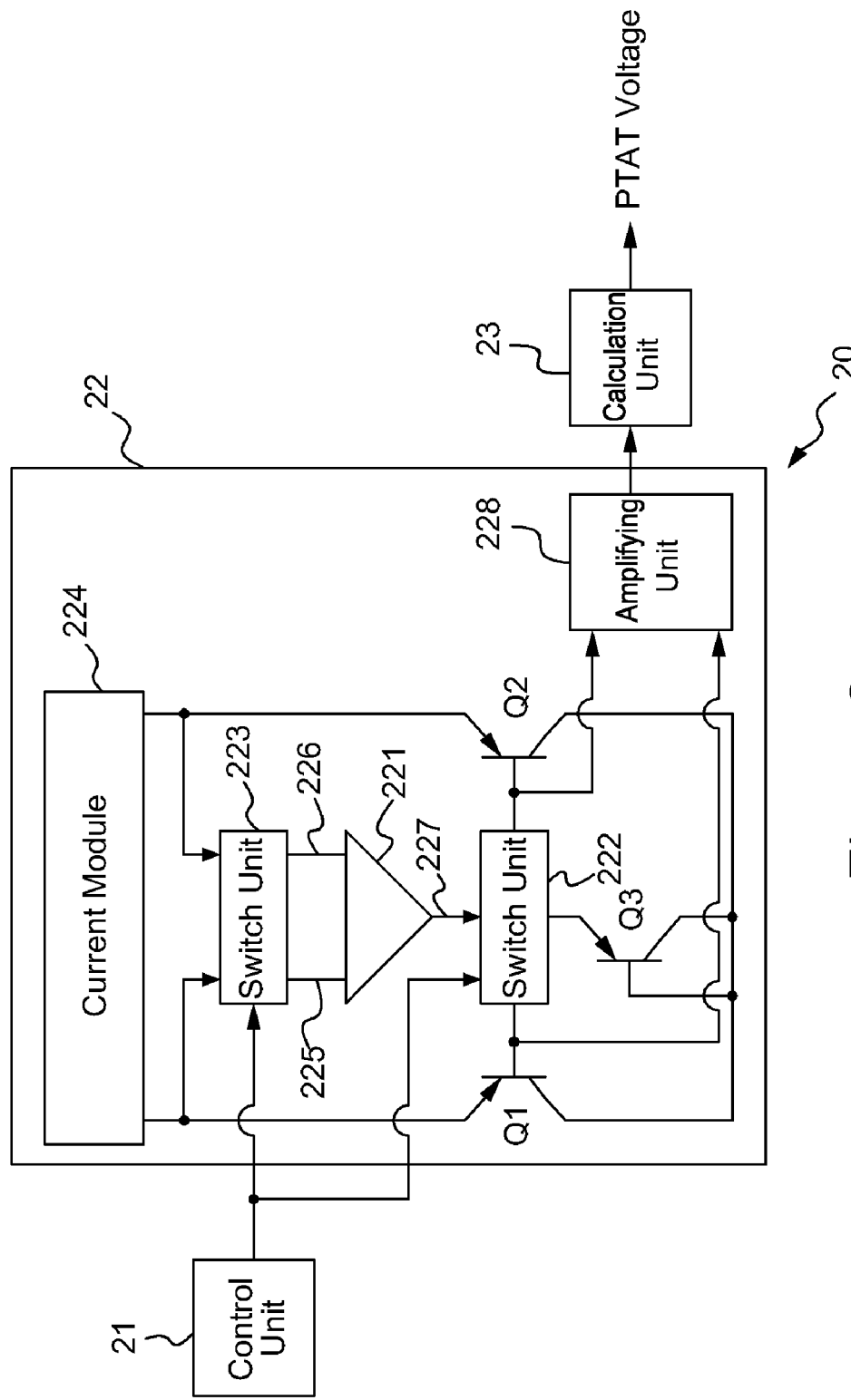
FIG. 2 is a schematic diagram of a PTAT sensor in accordance with an embodiment of the present invention.

FIG. 2 is a PTAT sensor 20 in accordance with an embodiment of the present invention. The PTAT sensor 20 comprises a control unit 21, a sensing unit 22, and a calculation unit 23. The PTAT sensor 20 senses an absolute temperature and outputs a corresponding PTAT voltage value. The control unit 21 generates a control signal to control the sensing unit 22 to switch between a plurality of circuit configurations as described in detail below. The sensing unit 22 comprises an amplifier 221, switch units 222 and 223, transistors Q1, Q2 and Q3, a current module 224, and an amplifying unit 228, where the transistors Q1, Q2 and Q3 are BJT transistors. The amplifier 221 has input ends 225 and 226, and an output end 227. A collector of the transistor Q1 is coupled to a collector of the transistor Q2, and emitters of the transistors Q1 and Q2 are coupled to the switch unit 223 and the current module 224. Bases of the transistors Q1 and Q2 are coupled to the switch unit 222 and the amplifying unit 228. In the sensing unit 22, a bias voltage is provided to the bases of the transistors Q1 and Q2 in order to keep an associated circuit working normally. The bias voltage value is determined according to a working voltage of the associated circuit. For example, the working voltage is an output voltage of the amplifier 221 or a working voltage of the amplifying unit 228. In this embodiment, the transistor Q3 is regarded as a bias circuit for providing the bias voltage. The emitter of the transistor Q3 is coupled to the switch unit 222 and the collector and base of the transistor Q3 are connected together to the collectors of the transistors Q1 and Q2. The bias circuit can also apply serial resistors (not shown) for dividing a bias voltage to be provided to the transistors Q1 and Q2.

Figure 3B:
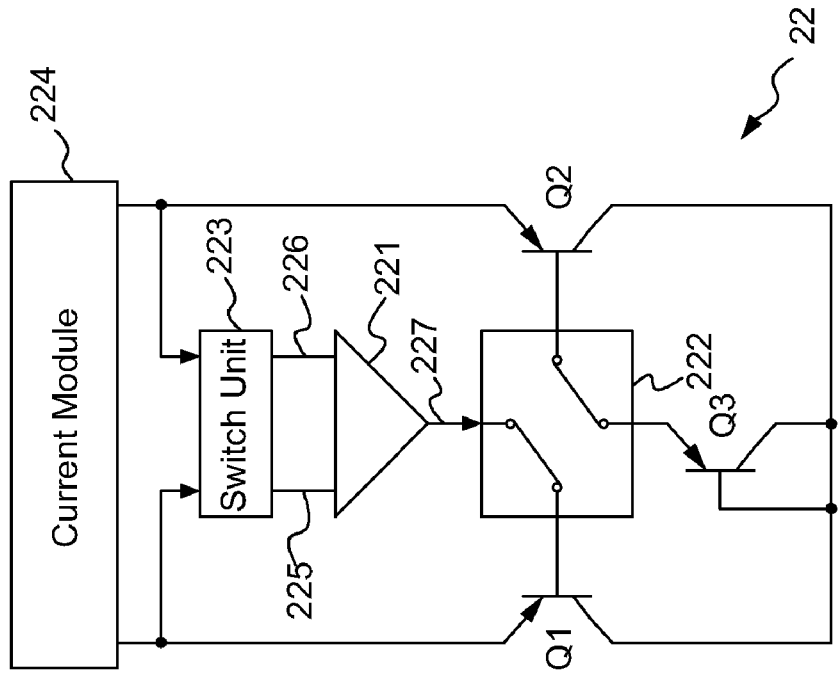
FIG. 3A and FIG. 3B are schematic diagrams of first and second connection configurations respectively.
Figure 3A:
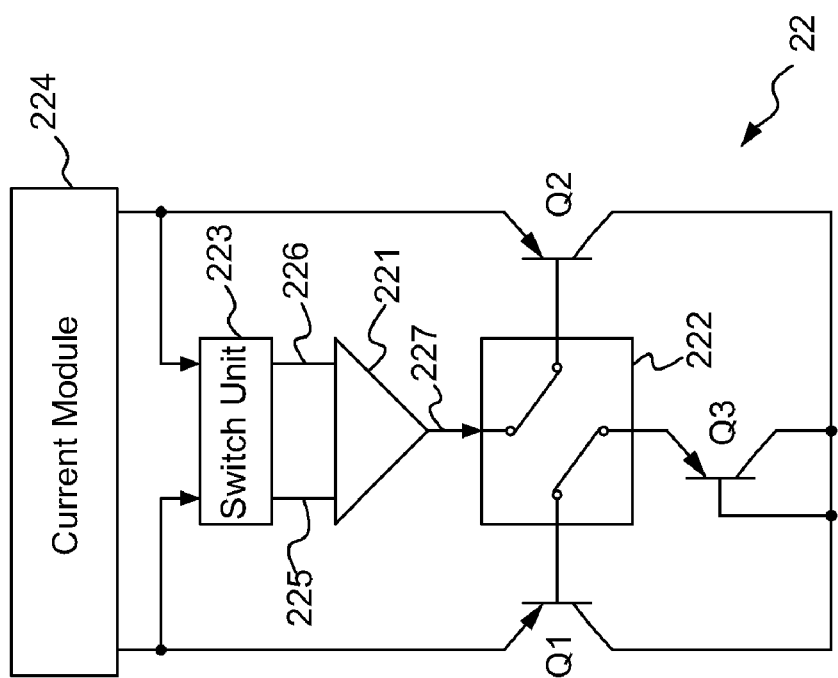

The switch unit 222, coupled between the output 227 and the transistors Q1, Q2 and Q3, switches between a first connection configuration and a second connection configuration according to the control signal provided by the control unit 21. The first connection configuration is that the base of the transistor Q1 is coupled to the emitter of the transistor Q3 and the base of the transistor Q2 is coupled to the output end 227, as illustrated in FIG. 3A. The second connection configuration is that the base of the transistor Q1 is coupled to the output end 227 and the base of the transistor Q2 is coupled to the emitter of the transistor Q3, as illustrated in FIG. 3B. In an embodiment of FIG. 2, the transistors Q1 and Q2 are designed to be a pair of circuit components having a matching relationship. For example, the transistors Q1 and Q2 have a same emitter area, and the first and second connection configurations are generated by interchanging connection relationships of the transistors Q1 and Q2. Moreover, in order to interchange currents flowing through the transistors Q1 and Q2, the current module 224 respectively provides a first current and a second current to the emitters of the transistors Q1 and Q2 under the first connection configuration, and respectively provides the second current and the first current to the emitters of the transistors Q1 and Q2 under the second connection configuration.

Figure 4B:
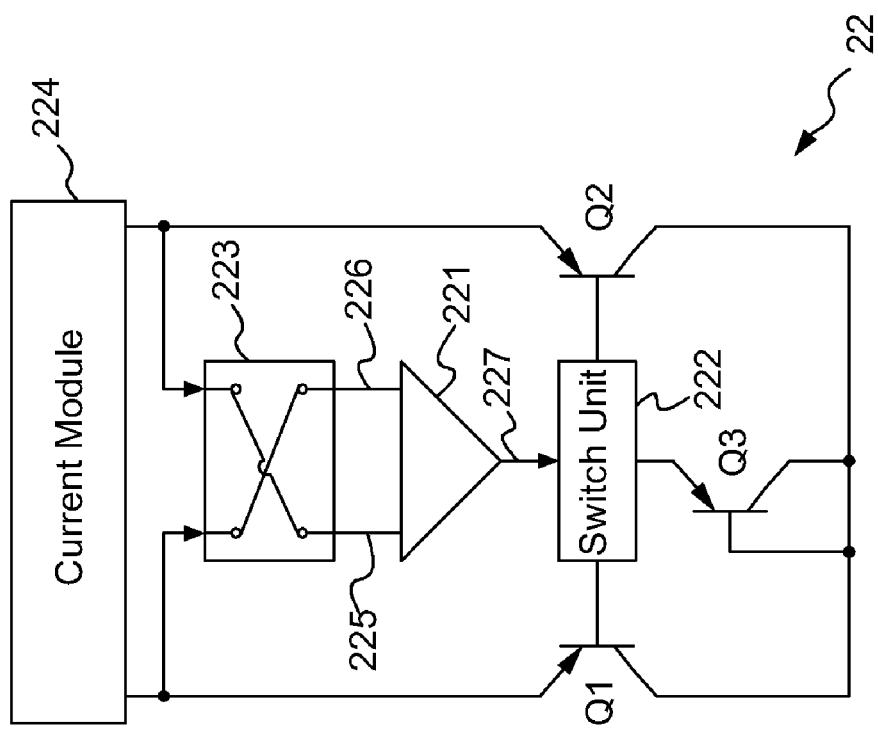
FIG. 4A and FIG. 4B are schematic diagrams of third and fourth connection configurations respectively.
Figure 4A:
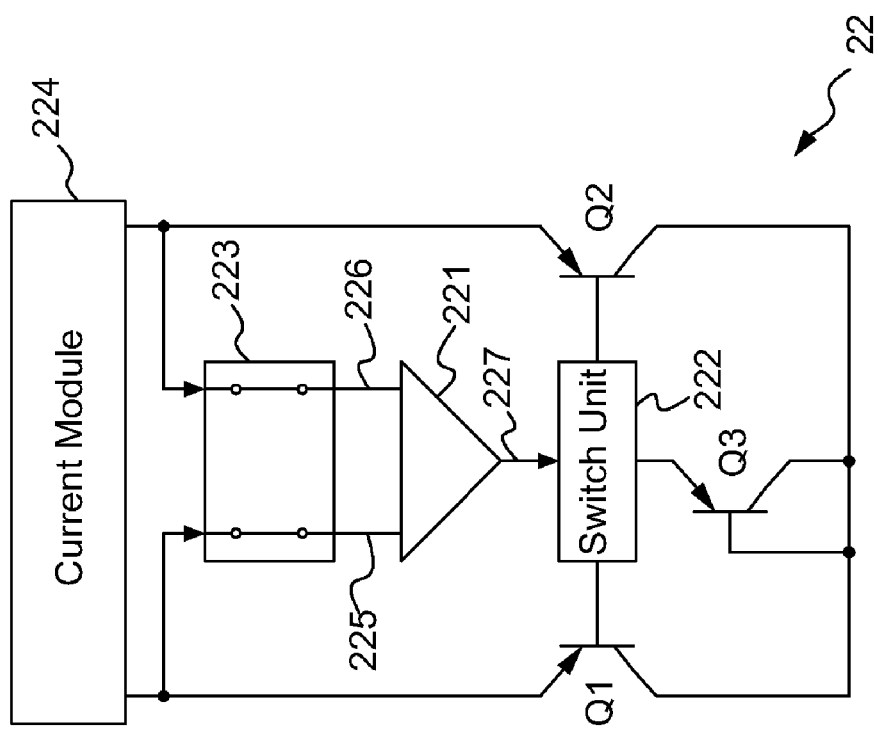

The switch unit 223, coupled to the input ends 225 and 226 and the transistors Q1 and Q2, switches between a third connection configuration and a fourth connection configuration according to the control signal provided by the control unit 21. The third connection configuration is that the emitters of the transistors Q1 and Q2 are respectively connected to the input ends 225 and 226, as illustrated in FIG. 4A. The fourth connection configuration is that the emitters of the transistors Q1 and Q2 are respectively connected to the input ends 226 and 225, as illustrated in FIG. 4B. The input ends 225 and 226 of the amplifier 221 are regarded as circuit components having a matching relationship, and the third and four connection configurations are generated by interchanging connection relationships of the input ends 225 and 226.

The switch units 222 and 223 are switched to generate the first, second, third and fourth connection configurations via the control signal generated by the control unit 21. Therefore, the sensing unit 22 generates four (2×2) types of circuit configurations according to the control signal. The control signal is a digital signal having two bit values such as 00, 01, and 11, which respectively represents the four circuit configurations.

The sensing unit 22 respectively senses an absolute temperature under the four circuit configurations to generate four corresponding analog voltage values to be transmitted to the calculation unit 23. The calculation unit 23 comprises an analog-to-digital converter (not shown) for converting the four analog voltages values transmitted from the sensing unit 22 to digital voltage values. The calculation unit 23 calculates an average value of the four digital voltage values, with the average value serving as the PTAT voltage value.

Following description takes the switch units 222 and 223 respectively switch to the first and third connection configurations for example. Referring to FIG. 3A and FIG. 4A, operation of the sensing unit 22 is described below. The first current and the second current respectively flow through the emitters of the transistors Q1 and Q2, and the transistors Q1 and Q2 can sense the absolute temperature. Therefore, the base-emitter voltage difference $\Delta V_{BE}$ between the transistors Q1 and Q2 satisfies Formula 3:

$$\Delta V_{BE} = V_T \ln[(I_{C1}/A_1)/(I_{C2}/A_2)],$$

Formula 3 is similar to Formula 1, where $I_{C1}$ and $I_{C2}$ are respectively collector currents of the transistors Q1 and Q2, and $A_1$ and $A_2$ are emitter areas of the transistors Q1 and Q2.

In this embodiment, Q1 and Q2 have a same emitter area and $I_{C1}/I_{C2}$ is equal to an emitter current proportion of the transistors Q1 and Q2. Therefore, Formula 3 is simplified as:

$$\Delta V_{BE} = V_T \ln[(I_{E1}/I_{E2})],$$

where $I_{E1}$ and $I_{E2}$ are respectively emitter currents of the transistors Q1 and Q2 (the first current and the second current). The emitters are respectively coupled to the input ends 225 and 226 of the amplifier 221. Therefore, an emitter voltage $V_{E1}$ of the transistors Q1 is equal to an emitter voltage $V_{E2}$ of the transistor Q2. Accordingly, $\Delta V_{BE}$ is represented as:

$$\Delta V_{BE} = V_{BE1} - V_{BE2} = (V_{B1} - V_{E1}) - (V_{B2} - V_{E2}) = V_{B1} - V_{B2},$$

where $V_{BE1}$ and $V_{BE2}$ are base-emitter voltages of the transistors Q1 and Q2, $V_{B1}$ and $V_{B2}$ are base voltages of the transistors Q1 and Q2, and $V_{E1}$ and $V_{E2}$ are the emitter voltages of the transistors Q1 and Q2. Therefore, $\Delta V_{BE}$ is equal to a base voltage difference of the transistors Q1 and Q2. Since the base voltage difference is very small, the sensing unit 22 transmits the base voltage difference to the amplifying unit 228 for amplification, so as to obtain a corresponding voltage value generated by sensing the absolute temperature under the first and third connection configurations. Other similar approaches are also applied to the sensing unit 22 under other circuit configurations to generate the corresponding voltage value.

Figure 5:
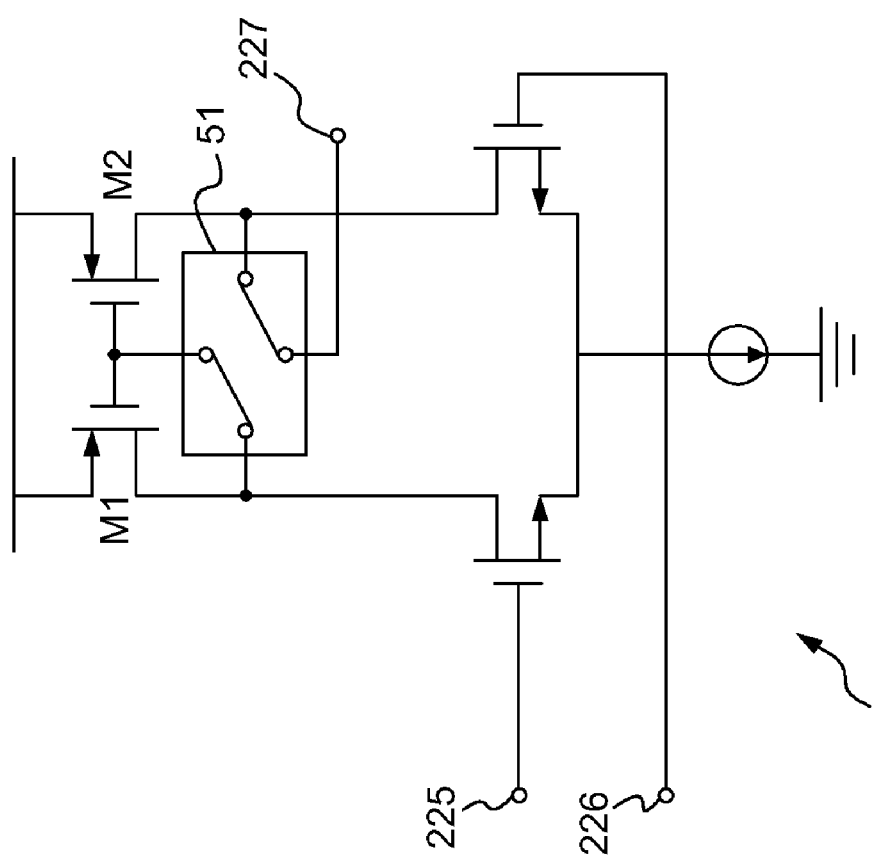
FIG. 5 is a circuit diagram of an amplifier of a sensing unit in accordance with a preferred embodiment of the present invention.

In a first preferred embodiment, the amplifier 221 in the sensing unit 22 has a pair of circuit components having a matching relationship and a corresponding switch unit. The switch unit interchanges connection relationships of the pair of circuit components according to the control signal generated by the control unit 21, so as to generate a fifth connection configuration and a sixth connection configuration. For example, in the amplifier 221 illustrated in FIG. 5, P-channel metal-oxide semiconductor (PMOS) transistors M1 and M2 are circuit components having a matching relationship, and gates of the transistors M1 and M2 are coupled to each other. The switch unit 51 switches between the fifth and sixth connection configurations according to the control signal. The fifth connection configuration is that the gate of the transistor M1 is coupled to a drain of the transistor M1 and a drain of the transistor M2 is coupled to the output end 227 of the amplifier 221. The sixth connection configuration is that the gate of the transistor M2 is coupled to a drain of the transistor M2 and a drain of the M1 is coupled to the output end 227. FIG. 5 shows the fifth connection configuration. Therefore, in the first preferred embodiment, the sensing unit 22 generates 8 ($2^3$) types of circuit configurations according to the control signal at least having 3 bits at this point. The sensing unit 22 senses an absolute temperature under eight circuit configurations respectively to generate eight corresponding voltage values. The voltage values are calculated by the calculation unit 23 to generate an average value to be served as a PTAT voltage value.

Figure 6:
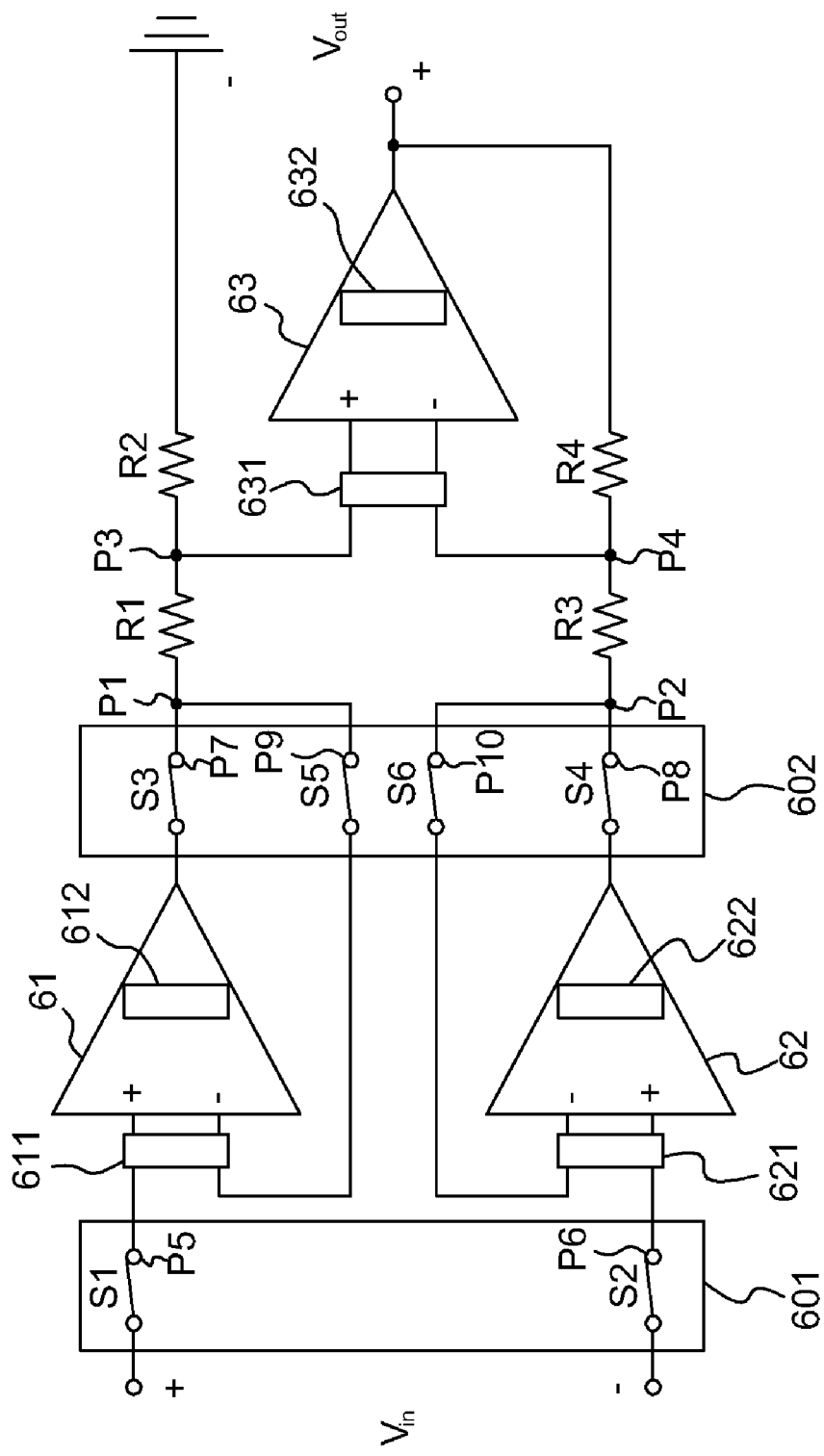
FIG. 6 is a circuit diagram of an amplifying unit of a sensing unit in accordance with a preferred embodiment of the present invention.

In a second preferred embodiment, the amplifying unit 228 of the sensing unit 22 is an instrument amplifier 60. Referring to FIG. 6, an input voltage and an output voltage of the instrument amplifier 60 are respectively $V_{in}$ (=$V_+$-$V_-$) and $V_{out}$, and the instrument amplifier 60 comprises three amplifiers 61, 62 and 63 and resistors $R_1$, $R_2$, $R_3$ and $R_4$. As mentioned above, two input ends of an amplifier are regarded as a pair of circuit components having a matching relationship, and the amplifier has a pair of internal circuit components having a matching relationship. Therefore, the instrument amplifier further comprises switch units 611, 612, 621, 622, 631 and 632. The switch units 611, 621 and 631 are used for respectively interchanging connection relationships of input ends of the amplifiers 61, 62 and 63. The switch units 612, 622 and 632 are used for respectively interchanging connection relationships of the pair of internal circuit components having the matching relationship in the amplifiers 61, 62 and 63. In addition, the amplifiers 61 and 62 are regarded as a pair of circuit components having a matching relationship. Therefore, the instrument amplifier 60 further comprises a switch unit 601 having switches S1 and S2, and a switch unit 602 having switches S3, S4, S5 and S6. The switch units 601 and 602 are used for interchanging connection relationships between the amplifier 61 and 62. That is, when the amplifiers 61 and 62 wish to interchange connection configurations as illustrated in FIG. 6, the switches S1 and S2 switch to P6 and P5 respectively, and the switches S3, S4, S5 and S6 switch to P8, P7, P10 and P9 respectively. All switch units inside the instrument amplifier 60 can perform switching according to the control signal generated by the control unit 21. Consequently, the instrument amplifier 60 can generate $2^7$ different circuit configurations. When the first preferred embodiment is incorporated to the second preferred embodiment, the sensing unit 22 can generate up to $2^3 \times 2^7 = 2^{10}$ types of circuit configurations, where the control signal has at least 10 bits.

Voltages between the two input ends of the amplifiers 61, 62 and 63 are regarded as being equal to each other. Thus, voltages of P1 and P2 are respectively equal to $V_+$ and $V_-$, and voltages of P3 and P4 are equal to each other, supposing that the voltage of P3 or P4 is $V_d$. In addition, no current flows through the two input ends of the amplifier 63 such that a current flows through $R_1$ is equal to a current flows through $R_2$ and a current flows through $R_3$ is equal to a current flows through $R_4$. Therefore, Formula 4 and Formula 5 are respectively represented as:

$(V_+ - V_d)/R_1 = V_d/R_2$, and $(V_- - V_d)/R3 = (V_d - V_{out})/R_4$.

Formula 6 is deduced from Formula 4 and Formula 5:

$$V_{out} = V_+ * \frac{1 + \frac{R_4}{R_3}}{1 + \frac{R_1}{R_2}} - V_- * \frac{R_4}{R_3}.$$

Taking $R_4 = 20 R_3$ and $R_2 = 20 R_1$ for example, Formula 6 is then:

$V_{out} = V_+ * 20 - V_- * 20 = 20 V_{in}$.

That is, the instrument amplifier 60 (the amplifying unit 228) has a gain of 20.

Furthermore, suppose that the sensing unit 22 has m pairs of circuit components having matching relationships, and a switch unit is designed to be corresponding to each pair of circuit components. By interchanging connection relationships of the circuit components according to the control signal generated by the control unit 21, two different circuit configurations are generated, where the control signal has at least m bits. Accordingly, the sensing unit 22 can generate $2^m$ types of circuit configurations and sense the absolute temperature under the $2^m$ types of circuit configurations respectively, so as to generate $2^m$ corresponding voltage values, which are then calculated by the calculation unit 23 to generate a PTAT voltage value.

Figure 7:
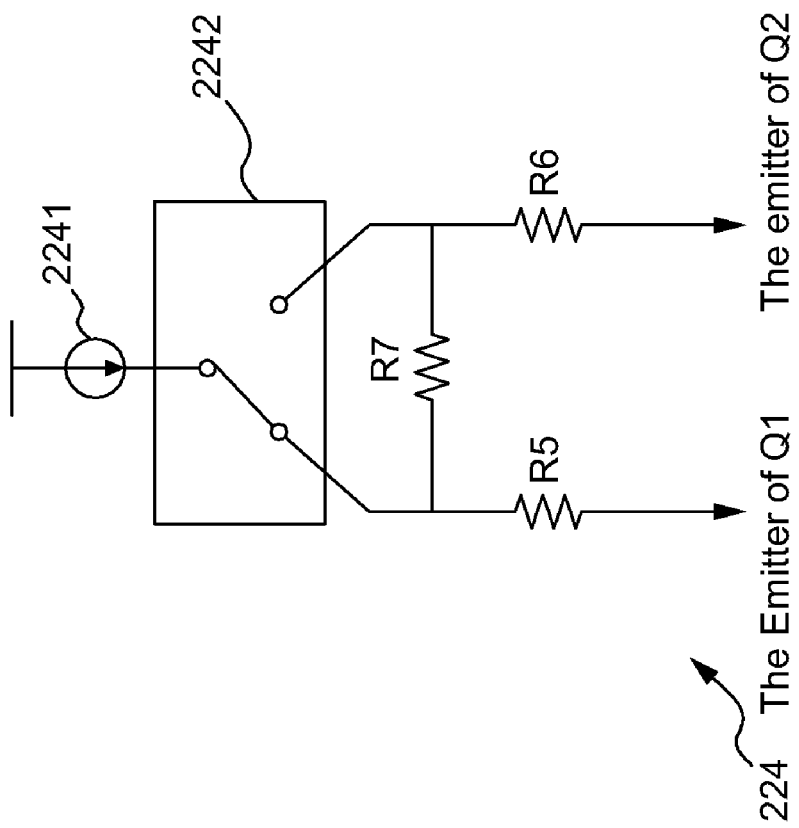
FIG. 7 is a circuit diagram of a current module of a sensing unit in accordance with a preferred embodiment of the present invention.

In a third preferred embodiment, the current module 24 comprises a current source 2241, resistors $R_5$, $R_6$ and $R_7$, and a switch unit 2242, as illustrated in FIG. 7. The resistors $R_5$ and $R_6$ has one end thereof coupled to emitters of the transistors Q1 and Q2 respectively, and the resistor $R_7$ is coupled between the other ends of the resistors $R_5$ and $R_6$. The switch unit 2242, coupled between the current source 2241 and the resistor $R_7$, switches to let the current source 2241 couple to a coupling point between the resistors $R_6$ and $R_7$ under the foregoing first connection configuration, and switches to let the current source 2241 couple to a coupling point between the resistors $R_5$ and $R_7$ under the foregoing second connection configuration. When the second current provided by the current module 224 is n (a positive number) times the first current, it is designed that $R_5$ and $R_6$ have a same resistance value and $R_7$ has a resistance value (n−1) times R5. That is, under the first connection configuration, a current (the second current at this point) flowing through $R_6$ and arriving at the emitter of the transistor Q2 is n times a current (the first current at this point) flowing through $R_7$ and $R_5$ and arriving at the emitter of the transistor Q2. Under the second connection configuration, a current (the second current at this point) flowing through $R_5$ and arriving at the emitter of the transistor Q1 is n times a current (the first current at this point) flowing through $R_7$ and $R_6$ and arriving at the emitter of the transistor Q2.

In a fourth preferred embodiment, the amplifier 221 of the sensing unit 22 is a differential output amplifier having input ends 225 and 226 and output ends 227A and 227B. The output ends 227A and 227B (comprised in the output 227 as shown in FIG. 2) of the amplifier 221 are connected to the switch unit 222. The switch unit 222, coupled between the output ends 227A and 227B and the transistors Q1 and Q2, switches between the first connection configuration and the second connection configuration according to the control signal provided by the control unit 21. The first connection configuration is that the base of the transistor Q1 is coupled to the output end 227A of the amplifier and the base of the transistor Q2 is coupled to the output end 227B of the amplifier. The second connection configuration is that the base of the transistor Q1 is coupled to the output end 227B of the amplifier and the base of the transistor Q2 is coupled to the output end 227A of the amplifier.

In the foregoing embodiments, the connection relationships of the entire circuit are established on the basis that the transistors Q1 and Q2 are PNP transistors. The transistors Q1 and Q2 are replaced by NPN transistors by re-arranging the entire circuit in reverse or only replacing the transistors Q1 and Q2 with NPN transistors. With a reverse arrangement of the circuit, the connection relationships of the circuit remain unchanged. When the transistors Q1 and Q2 are replaced by NPN transistors, the emitters and collectors of the transistors Q1 and Q2 according to the foregoing embodiments change to collectors and emitters respectively, while other circuit relationships also remain unchanged.

Figure 8:
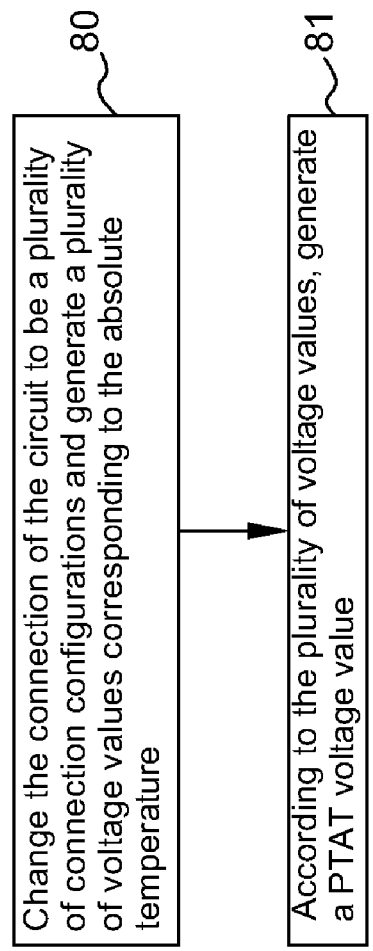
FIG. 8 is a flow chart of a PTAT sensing method in accordance with an embodiment of the present invention.

FIG. 8 is a flow chart of a PTAT sensing method in accordance with an embodiment of the present invention. The method comprises steps below. In Step 80, a circuit for sensing an absolute temperature is changed the connection to be a plurality of connection configurations such that a plurality of voltage values corresponding to the absolute temperature are generated. The plurality of connection configurations are generated by interchanging connection relationships between at least one pair of circuit components having a matching relationship. In Step 81, a PTAT voltage value is generated according to the plurality of voltage values, and the PTAT voltage value can be an average value of the plurality of voltage values, for example.

While the invention has been described in terms of what is presently considered to be the most practical and preferred embodiments, it is to be understood that the invention needs not to be limited to the above embodiments. On the contrary, it is intended to cover various modifications and similar arrangements included within the spirit and scope of the appended claims which are to be accorded with the broadest interpretation so as to encompass all such modifications and similar structures.

What is claimed is:

1. A proportional to absolute temperature (PTAT) sensor, comprising:
   a control unit, for generating a control signal;
   a sensing unit, coupled to the control unit comprising:
      an amplifier having a first input end, a second input end, and an output end;
      a first transistor having a first collector, a first emitter, and a first base, wherein the first emitter is coupled to the first input end of the amplifier;
      a second transistor having a second collector, a second emitter, and a second base, wherein the second collector is coupled to the first collector, and the second emitter is coupled to the second input end of the amplifier;
      a first switch unit, coupled to the output end of the amplifier, the first transistor, and the second transistor, wherein the first switch connects the output end of the amplifier to the first transistor in a second connection configuration, or the first switch connects the output end of the amplifier to the second transistor in a first connection configuration according to the control signal;
      a current module, coupled to the first transistor and the second transistor, wherein the current module provides a first current to the first emitter and a second current to the second emitter under the first connection configuration, or the first current module provides the second current to the first emitter and the first current to the second emitter under the second connection configuration according to the control signal;
      wherein the sensing unit generates a first voltage value by sensing an absolute temperature under the first connection configuration, and generates a second voltage value by sensing the absolute temperature under the second connection configuration; and
   a calculation unit, coupled to the sensing unit, for calculating a PTAT voltage value according to the first voltage value and the second voltage value.

2. The PTAT sensor as claimed in claim 1, wherein the PTAT voltage value is an average value of the first voltage value and the second voltage value.

3. The PTAT sensor as claimed in claim 1, wherein under the first connection configuration, the first base is coupled to a bias voltage and the second base is coupled to the output end of the amplifier, and under the second connection configuration, the first base is coupled to the output end and the second base is coupled to the bias voltage.

4. The PTAT sensor as claimed in claim 3, further comprising:
   a bias circuit, coupled to the first switch unit, for providing the bias voltage; and
   a second switch unit, coupled to the first input end, the second input end, the first transistor, and the second transistor, for switching between a third connection configuration and a fourth connection configuration according to the control signal, wherein under the third connection configuration, the first emitter is coupled to the first input end, and the second emitter is coupled to the second input end, and under the fourth connection configuration, the first emitter is coupled to the second input end, and the second emitter is coupled to the first input end.

5. The PTAT sensor as claimed in claim 4, wherein the sensing unit further generates a third voltage value by sensing the absolute temperature under the third connection configurations, and generates a fourth voltage value by sensing the absolute temperature under the fourth connection configuration, and the calculation unit generates the PTAT voltage value according to the first voltage value, the second voltage value, the third voltage value, and the fourth voltage value.

6. The PTAT sensor as claimed in claim 4, wherein the amplifier has a pair of internal circuit components, and the circuit connections of the pair of circuit components are interchanged to form a fifth connection configuration and a sixth connection configuration.

7. The PTAT sensor as claimed in claim 4, wherein the sensing unit further comprises:
   an voltage amplifying unit, coupled to the calculation unit, for amplifying the first voltage value and the second voltage value.

8. The PTAT sensor as claimed in claim 7, wherein the voltage amplifying unit is an instrument amplifier.

9. The PTAT sensor as claimed in claim 6, wherein the sensing unit generates a plurality of connection configurations, including the first connection configuration and the second connection configuration, according to the control signal and senses the absolute temperature under the plurality of circuit configurations to generate a plurality of voltage values, and the calculation unit calculates the PTAT voltage value according to the plurality of voltage values.

10. The PTAT sensor as claimed in claim 1, wherein the calculation unit comprises an analog-to-digital converter for converting the first voltage value and the second voltage value from analog values to digital values.

11. The PTAT sensor as claimed in claim 1, wherein the second current is n times the first current, and n is a positive number, the current module comprises:
   a current source;
   a first resistor with a first coupling end and a second coupling end, wherein said first coupling end is coupled to the first emitter;
   a second resistor with a third coupling end and a fourth coupling end, wherein said third coupling end is coupled to the second emitter;
   a third resistor with a fifth coupling end and a sixth coupling end, wherein said fifth coupling end is coupled to said second coupling end and said sixth coupling end is coupled to said fourth coupling end; and
   a third switch unit coupled to the current source, said fifth coupling end, and said sixth coupling end, wherein said third switch connects the current source to said fifth coupling end under the first connection configuration, and connects the current source to said sixth coupling end under the second connection configuration;
   wherein the first resistor and the second resistor have a first resistance value, and the third resistance value is n−1 times the first resistance value.

12. A PTAT sensor, comprising:
   a control unit, for generating a control signal;
   a sensing unit, comprising a pair of circuit components having a matching relationship, generating a first voltage value by sensing an absolute temperature under a first connection configuration and generating a second voltage value by sensing the absolute temperature under a second connection configuration according to said control signal; and a calculation unit, coupled to the sensing unit, for calculating a PTAT voltage value according to the first voltage value and the second voltage value.

13. The PTAT sensor as claimed in claim 11, wherein the PTAT voltage value is an average value of the first voltage value and the second voltage value.

14. A PTAT sensing method, comprising:

generating a plurality of voltage values by switching a PTAT circuit to a plurality of connection configurations, wherein the plurality of connection configurations are formed by interchanging circuit connections of one pair of circuit components having a matching relationship; and calculating a PTAT voltage value according to the plurality of voltage values.

15. The PTAT sensing method as claimed in claim 13, wherein the PTAT voltage value is an average value of the plurality of voltage values.

* * * * *